UNITED STATES PATENT OFFICE.

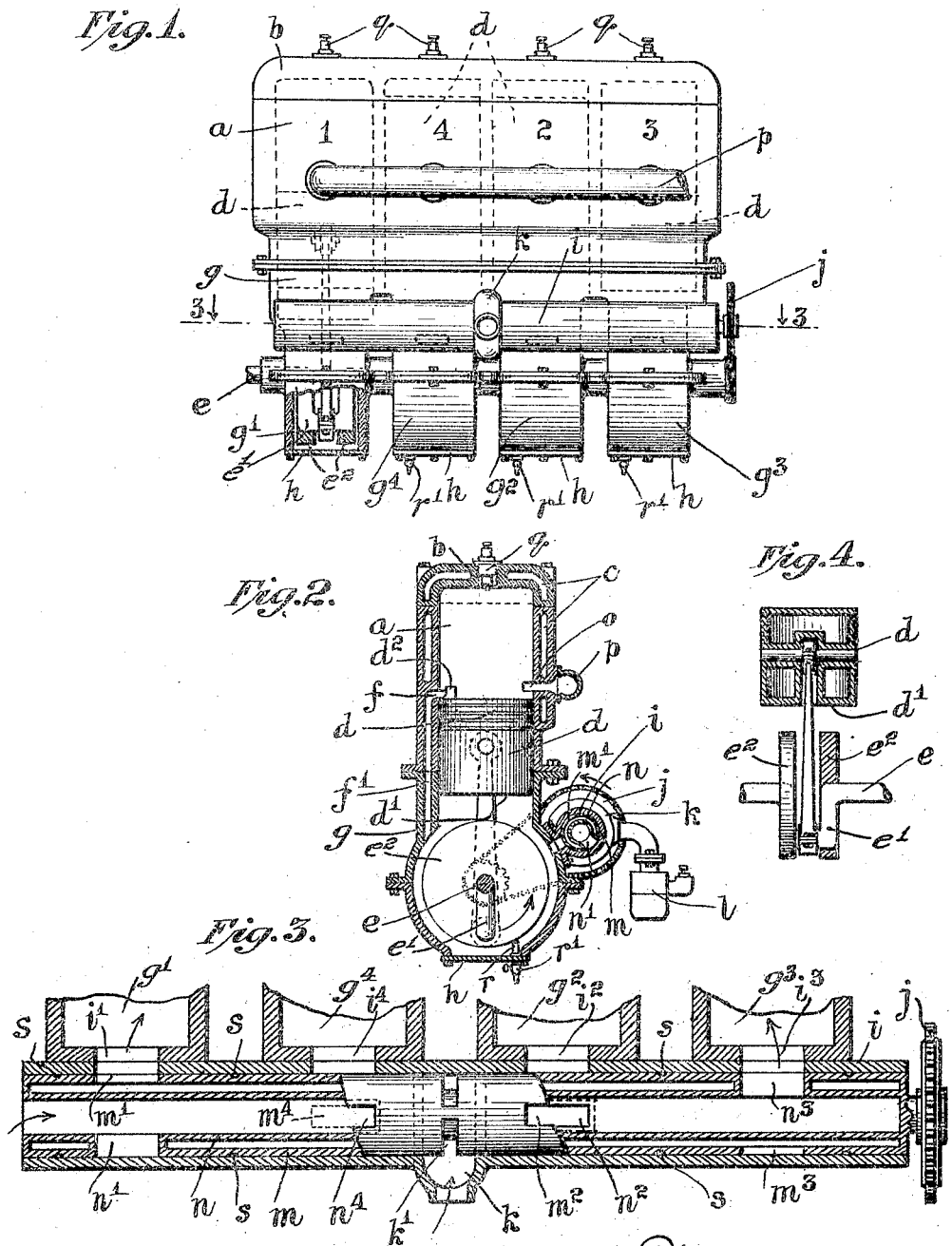

WALTER K. THOMAS, OF NEW YORK, N. Y., ASSIGNOR TO HIMSELF, AS TRUSTEE.

INTERNAL-COMBUSTION ENGINE 1,051,289.

Specification of Letters Patent.

Patented Jan. 21, 1913.

Application filed December 8, 1911. Serial No. 664,660.

*To all whom it may concern:*

Be it known that I, WALTER K. THOMAS, a citizen of the United States, residing in the borough of Brooklyn, in the city of New York, county of Kings, and State of New York, have invented certain new and useful Improvements in Internal-Combustion Engines, of which the following is a specification, reference being had therein to the accompanying drawings, which form a part thereof.

My invention relates to internal combustion engines, and more particularly to a type of four cycle, valveless engine.

The main object of the invention is to provide an internal combustion engine of the four cycle type wherein the cylinder will have no moving parts therein excepting the piston, and wherein the manner of introducing the explosive charge will be such as to secure high efficiency and the elimination of likelihood of the firing of an explosive charge before its entrance to the cylinder.

A further object is to provide an engine of this type wherein each charge will be compressed by the movement of the piston prior to its introduction to the cylinder, and wherein at no time will the space on opposite sides of the piston be filled with an explosive gas, thus avoiding firing across the piston.

A still further object is to provide an engine of the four cycle type wherein the cylinder will be scavenged after each explosion, and prior to each introduction of the explosive mixture thereto so as to minimize the volume of exhaust gases in the cylinder, to secure a pure mixture in said cylinder, and to prevent the rapid fouling of said cylinder.

A still further object is to provide an engine of the four cycle type wherein after each explosion a scavenging charge is introduced to the cylinder under conditions which will cushion the piston upon the upstroke succeeding the explosion stroke, thus minimizing vibration in the engine, and serving to more completely scavenge the cylinder, and at the same time aid in cooling the cylinder.

A still further object is to provide an engine of the four cycle type utilizing a scavenging charge.

A still further object is to provide an engine of the four cycle type wherein the intake and exhaust ports will be controlled solely through the movement of the piston itself and the valve mechanism for regulating the supply of explosive mixture will be removed from the area of high temperatures about the cylinder so as to avoid the heating of the valve mechanism and permit the use of a rotary valve without subjecting it to those undesirable conditions arising from the expansion and contraction thereof due to the heat radiated from the cylinder.

A still further object is to provide in an engine of the four cycle type a valve mechanism having continuous air and explosive mixture ducts therein adapted to be alternately connected with a plurality of cylinders successively in a manner to insure the proper timing of the admission of the explosive mixture, and the scavenging charges thereto.

A still further object is to provide a simple and convenient means of communication between said valve mechanism and the carbureter, or other source of supply for the explosive mixture. And a still further object is to provide an engine of this type, the design of which will be simple and such as to permit of ready access thereto for purposes of inspection or repair.

The invention consists primarily in an engine of the four cycle type, embodying therein a cylinder having an inlet and an outlet port adjacent to one end thereof, a reciprocatory piston adapted, toward the end of the stroke, to open said exhaust port and said intake port successively, means forming a chamber in communication with said intake port and subject to pressure from a piston, and a valve mechanism for introducing the explosive mixture to said chamber during the fourth stroke of the cycle, said valve mechanism being so set as to exclude the explosive mixture from said chamber during the compression and explosion strokes of the engine; and in such other novel features of construction and combination of parts as are hereinafter set forth and described, and more particularly pointed out in the claims hereto appended.

Referring to the drawings: Figure 1 is an elevation of a four cylinder engine embodying my invention; Fig. 2 is a vertical section through one of the cylinders thereof; Fig. 3 is a section of the valve mechanism on the line 3—3 of Fig. 1, on an enlarged scale; and Fig. 4 is a detail sectional view of the piston and crank shaft mechanism for limiting the capacity of the crank case to increase the degree of compression of the fluid delivered thereto.

Like letters refer to like parts throughout the several views.

In the embodiment of my invention shown in the drawings, $a$ indicates a cylinder casting having a removable head $b$ and provided with the ordinary water jacket $c$. The engine shown in the drawings is of the four cylinder type, although the number of cylinders is immaterial to my invention.

For convenience in describing the mode of operation of the valve mechanism, I have indicated the cylinders in their order of actuation by the reference numerals 1, 2, 3 and 4, but in the following description will refer to the detailed arrangement of but one such cylinder, as all said cylinders are alike in every respect.

Each cylinder has mounted therein an ordinary reciprocatory piston $d$ connected in the usual manner by a piston rod $d'$ with its crank $e'$ on the shaft $e$. The details of these parts may be in accordance with any approved practice in connection with internal combustion engines, and are immaterial to this invention.

To avoid the necessity for a suction stroke of the piston and also to avoid the presence of an intake valve about the heated portions of the engine, I provide means in conjunction with each cylinder, forming a chamber wherein the down stroke of the piston will compress a charge and prepare it for introduction into the cylinder at a predetermined moment as determined by the movement of the piston in its stroke. Each cylinder is provided adjacent to one end thereof with an intake port $f$ arranged so as to be normally closed by the piston $d$ and to be opened only as said piston approaches the limit of its stroke, said port being in communication with said chamber through an uninterrupted duct $f'$ so as to permit the explosive mixture under compression to flow into said cylinder as said intake port is opened through the movement of said piston. The piston $d$ on the top thereof adjacent to the said intake port $f$, is provided with a deflector plate $d^2$ adapted to cause the inflowing mixture to be directed toward the cylinder head, in the manner ordinarily employed in two-cycle engines.

In order to simplify the design of the engine, particularly in small units, I preferably use the crank casing as the compression chamber above referred to, this arrangement lending compactness of structure, and this type of engine permitting the use of a crank case of a capacity approximating that of the cylinder itself. Carrying out this preferred structure, I provide a flanged crank case casting $g$ bolted to the cylinder casting $a$, having therein a plurality of crank cases $g'$, $g^2$, $g^3$, $g^4$, forming independent, non-communicating compression chambers each having leading therefrom a duct $f'$. These cases $g'$, $g^2$, $g^3$ and $g^4$, are split in the usual manner to form bearings for the shaft $e$. Each said case is provided with a bottom hand hole closed by a plate $h$ to permit convenient access to the crank and piston connection.

Each compression chamber is provided with a valve mechanism controlling the flow of the mixture from the carbureter, or other source of supply of the explosive mixture, thereto, which mechanism is so actuated as to admit such mixture to each chamber but once during two rotations of the shaft $e$, thus avoiding all those dangers resulting from the presence of an explosive mixture on both sides of the piston at the same time. To equalize the pressures in front of the piston on both the direct and the return reciprocation thereof, I preferably so arrange this valve mechanism as to alternately deliver to said chamber an explosive and a non-explosive fluid with the successive rotations of the shaft $e$, thus not only securing the desired cushioning effect, but permitting the use of the non-explosive fluid as a scavenging charge in a manner which will hereinafter appear.

To simplify the valve mechanism above referred to, I prefer to use a casing $i$ extending the entire length of the casting $a$ and having laterally elongated narrow ports $i'$, $i^2$, $i^3$ and $i^4$, opening into the compression chambers formed within the crank cases $g'$, $g^2$, $g^3$, $g^4$. This casing or housing $i$ has a longitudinal cylindrical bore and rotatably mounted therein is a rotary valve actuated from the shaft $e$ by a single chain and sprocket mechanism $j$ arranged at one end of the casing. Extending circumferentially about a portion of the casing or housing $i$ is a conduit $k$ opening into which is the lead pipe from the carbureter $l$.

The rotary valve above referred to comprises two concentric tubes $m$ and $n$, the inner of which, ($n$) is closed at one end only and opens at the other end into atmosphere, and the other of which ($m$) is closed at both ends, (see Fig. 3.) The tube $m$ has a plurality of gas ports $m'$, $m^2$, $m^3$, $m^4$ extending therethrough and adapted to register with the ports $i'$, $i^2$, $i^3$, $i^4$, respectively, the first named ports being arranged substantially 90 degrees apart and being of slightly less than 90 degrees in length in order to secure the timely opening and closing of said last named ports and avoid a back pressure therethrough. The tube $n$ also has a plurality of air ports $n'$, $n^2$, $n^3$, $n^4$, similar in their arrangement and dimensions to the gas port acting in conjunction with the same port in the casing or housing $i$.

These ports $n'$, $n^2$, $n^3$, $n^4$ are adapted to register with the ports $i'$, $i^2$, $i^3$, $i^4$ through short gas-tight tubes, (see Fig. 3) which also serve as stays for the tubes $m$ and $n$. The tube $m$ is constantly in communication with the conduit $k$ through one or more ports $k'$ in said tube, which with the open end of the tube $n$ results in a structure wherein the valve mechanism itself serves as a manifold. This valve arrangement is adapted for use in connection with a driving means actuated from the main shaft, the valve being geared down from said shaft in the ratio of 2 to 1.

At the end of the cylinder adjacent to the port $f$, I form an exhaust port $o$ in communication with the exhaust manifold $p$. The port $o$ is adapted to be opened and closed through the reciprocatory movement of the piston $d$. This port is arranged sufficiently in advance of the intake port $f$ to insure the opening of the exhaust port $o$ before the initiation of the opening of the intake port, thus permitting a large volume of the exhaust gases to escape before the opening of the port $f$ and reducing the pressure within the cylinder so as to cause the charge under compression to flow freely into the cylinder and aid in displacing the exhaust gases remaining in the cylinder after the opening of the exhaust port.

The head casting $c$ has no ports therein and carries merely the ignition plug $q$. It is made detachable from the cylinder casting $a$ to facilitate the removal of the piston.

I preferably use a splash system of lubrication, and in order to maintain the oil level within the crank case, I provide each case with a drain pipe $r$ projected to a predetermined height within said case, which pipe is controlled by the pet cock $r'$.

To take advantage of the engine lubricating system, I position the ports $i'$, $i^2$, $i^3$, $i^4$ so that oil will be thrown therethrough upon the up stroke of the crank $e'$. Between adjacent sets of gas and air ports $m'$ $n'$, $m^2$ $n^2$, etc., I encircle the tube $m$ with grooves $s$, adapted to retain lubricant and at the same time fluid pack said tube.

The capacity of the compression chambers, in order to secure an effective compression of the fluid delivered thereto, whether the same be an explosive mixture, or atmospheric air, must be limited so as to approximate that of the cylinder. When I utilize the crank cases $g'$ $g^2$ $g^3$ $g^4$ to form these compression chambers, I limit the capacity thereof for the purpose above referred to by forming within the piston $d$ an inner shell $d'$ adapted to completely close the bottom of said piston, leaving only a channel adapted to permit the oscillatory movement of the piston rod, and mount upon each side of the crank $e'$ a solid disk $e^2$ occupying a considerable portion of the space within said casing, leaving only clearance enough to permit the movement of the piston rod and at the same time clearance on the side of said disks sufficient to admit the fluid drawn within said case. By this means I reduce the capacity of the ordinary crank case to a degree where I am enabled to develop approximately thirty pounds pressure within the case. This results in economy in the operation of the engine, as but a very small portion of the fluid will remain in the casing after each charge has been delivered to the cylinder.

The operation of the herein described internal combustion engine is substantially as follows:—In describing the mode of operation of my improved engine, I will do so assuming that the parts are in the relation shown in the drawings, in which the piston of cylinder 1 has reached the limit of its fourth stroke of the cycle. As said piston makes its up or suction stroke, it will draw the explosive mixture through the ports $m'$ and $i'$ into the compression chamber, which in the form of the invention shown in the drawings, comprises the crank case $g'$. This suction will draw the mixture from the carbureter $l$ through the tube $m$, and the port or ports $k'$ therein in constant communication with the conduit $k$. With the succeeding down stroke of the piston of the cylinder 1, the explosive charge drawn into the said compression chamber or case $g'$ will be compressed in said chamber and as said cylinder opens the port $f$, this mixture under a pressure of about 30 pounds will be admitted to the cylinder 1 through the conduit $f'$ and port $f$. Upon the succeeding up or compression stroke of the piston, this charge will be compressed in the cylinder and ignited to produce the explosion stroke of the piston. As the said piston begins its compression stroke, and after it closes the port $f$, the valve port $n'$ will come to register with the port $i'$ and the suction created within the compression chamber or crank case $g'$ will draw air through the tube $n$ into said case and this air will be compressed in said chamber or case upon the explosion stroke of the engine so that during the compression stroke and during the explosion stroke of the engine, said compression chamber will contain a non-explosive fluid, thus making firing across the piston impossible. When the piston has reached the limit of its compression stroke, the charge will be ignited, and the explosion stroke will follow. With the third stroke of the piston, the scavenging charge in the compression chamber or case $g'$ will be compressed and after the port $o$ has been opened to permit the escape of the exhaust gas, the intake port $f$ will be opened and the scavenging charge under pressure will be admitted to the cylinder, the deflector plate $d^2$ upon the piston projecting this charge upwardly so as to cause the air to displace the exhaust gas near the cylinder head and thus aid in the escape of the exhaust gases. While there will not be a complete exhaustion of these gases, those remaining will be so diluted as to minimize the quantity of inert gas in the cylinder. This completes the fourth cycle of the engine as the succeeding stroke of the piston is the suction stroke, or first stroke of the cycle. During this stroke, the scavenging charge thus introduced to the cylinder is compressed therein and upon the succeeding down or intake stroke this scavenging charge is permitted to escape through the opening of the port o which escape is accelerated by the deflection of the incoming explosive mixture by the deflector plate $d^2$ toward the top of the cylinder.

The cycle of the engine is divided into four strokes, as follows:—first, suction of explosive charge into compression chamber, and compression of scavenging charge in the cylinder; second, compression of explosive charge in compression chamber, intake of explosive charge to the cylinder, and exhaust of scavenging charge; third, compression of explosive charge in the cylinder, and suction of scavenging charge into compression chamber; fourth, ignition and explosion of gas charge, compression of scavenging charge in compression chamber and delivery to cylinder.

It will thus be observed that by the construction described, I secure in a four cycle engine not only all of the features of the ordinary four cycle engine, but in addition thereto the added function of a scavenging of the cylinder prior to the introduction thereto of each explosive charge. Furthermore, I am enabled to deliver the explosive charge to the cylinder under pressure developed by the piston itself, avoid the presence of any vacuum in the cylinder, and in addition to providing a cushion upon both sides of the piston at all times, secure a more perfect exhaustion of the inert gases after the explosion stroke. By this construction, I am enabled to arrange my valve mechanism away from the heated cylinder so as to avoid any possibility of the fouling or binding thereof by the carbon particles or the high temperatures.

While I prefer to use a rotary valve such as I have shown and described, it is not my intention to limit the invention in its broader aspects to a valve mechanism of this type. This construction, however, permits a perfect timing of the intake of the explosive charge and the scavenging charge, as to all cylinders included in the unit, and for engines of low H. P. it is found very desirable.

The engine cycle above described relates to a single cylinder, but each cylinder will operate in this cycle, the order followed ordinarily being cylinder 1 first, then cylinders 2, 3 and 4 successively.

When using a crank case as a compression chamber by reducing the capacity thereof in the manner described, I am enabled to secure the desired high pressures of the charges prior to admission to the cylinder to insure a sufficiently large discharge into the cylinder to avoid waste, or a poor mixture, of the gaseous charge, while at the same time avoiding the presence of sufficient gas in the scavenging charge to produce an explosive mixture. The ports $f$ and $o$ are so positioned, and the valve mechanism so set, as to insure that lead necessary to secure the proper exhaustion of the gases in the cylinder.

When I use a rotary valve, such as I have described, the grooves $s$ will prevent leakage from one port to the adjoining port, and the oil thrown through the ports $i'$ $i^2$ $i^3$ and $i^4$ will lubricate said valve tube to the desired extent.

While the compression of the explosive charge in the compression chamber and of the scavenging charge in the cylinder will tend to place slight additional load upon the engine, this load will be compensated for by the expansive force of said scavenging charge while the explosive charge is being compressed.

The detailed construction shown is merely for convenience in assembling, inspection and repair.

It is not my intention to limit the invention to the precise details of construction shown in the accompanying drawings, it being apparent that such may be modified without departing from the spirit or scope of the invention.

Having described my invention, what I claim as new and desire to have protected by Letters Patent, is:—

1. An internal combustion engine of the four cycle type, embodying therein a cylinder having an intake and an exhaust port adjacent to one end thereof, a reciprocatory piston, adapted, toward the end of the stroke, to open said exhaust port and said intake port successively, means forming a chamber in communication with said intake port and subject to pressure from the piston, and a valve mechanism for introducing the explosive mixture into said chamber during one stroke of the cycle, said valve mechanism being so set as to exclude the explosive mixture from said chamber during the compression and explosion strokes of the piston.

2. An internal combustion engine of the four cycle type, embodying therein a cylinder having an intake and an exhaust port adjacent to one end thereof, a crank case in communication with said cylinder through said intake port, a reciprocatory piston adapted, toward the end of the stroke, to open said exhaust port and said intake port successively, and a valve mechanism for introducing an explosive mixture into said crank case during one stroke of the cycle, said valve mechanism being so set as to exclude the explosive mixture from said case during the compression and explosion strokes of the piston, whereby said explosive charge will be compressed in said crank case by the piston, and firing across the piston is prevented.

3. An internal combustion engine of the four cycle type, embodying therein a cylinder having an inlet and an outlet port adjacent to one end thereof, a crank case in communication with said cylinder through said intake port, means limiting the capacity of said crank case to substantially that of said cylinder, a reciprocatory piston, adapted, toward the end of the stroke, to open said exhaust port and said intake port successively, and a valve mechanism for introducing an explosive mixture to said crank case during one stroke of the cycle, said valve mechanism being so set as to exclude the explosive mixture from said case during the compression and explosion strokes of the piston, whereby said explosive charge will be compressed in said crank case by the piston, and firing across the piston is prevented.

4. An internal combustion engine of the four cycle type, embodying therein a cylinder having an intake and an exhaust port adjacent to one end thereof, a reciprocatory piston, adapted, toward the end of the stroke to open said exhaust port and said intake port successively, a deflector plate upon the top of said piston whereby the incoming fluid is directed toward the cylinder head, means forming a chamber in communication with said intake port and subject to pressure from the piston, and a valve mechanism for introducing the explosive mixture to said chamber during one stroke of the cycle, said valve mechanism being so set as to exclude the explosive mixture from said chamber during the compression and explosion strokes of the piston.

5. An internal combustion engine of the four cycle type, embodying therein a cylinder having an intake and an exhaust port adjacent to one end thereof, a reciprocatory piston, means forming a chamber in communication with said intake port and subject to pressure from the piston, and a valve mechanism adapted to alternately deliver a charge of an explosive mixture and a scavenging charge to said chamber, whereby said charges will be alternately compressed and delivered to said cylinder through said intake port, and said piston will never have an explosive fluid upon both sides thereof at the same time.

6. An internal combustion engine of the four cycle type, embodying therein a cylinder having an intake and an exhaust port adjacent to one end thereof, a reciprocatory piston adapted through its movement to automatically open and close said ports, means forming a chamber in communication with said intake port and subject to pressure from the piston, and a valve mechanism adapted to alternately deliver a charge of an explosive mixture and a scavenging charge to said chamber, whereby said charges will be alternately compressed and delivered to said cylinder through said intake port, and said piston will never have an explosive fluid upon both sides thereof at the same time.

7. An internal combustion engine of the four cycle type, embodying therein a cylinder having an intake and an exhaust port adjacent to one end thereof, a reciprocatory piston, a crank case communicating with said cylinder through said intake port and with said cylinder below said piston whereby gases therein contained will be compressed by said piston and delivered to said cylinder, and a valve mechanism adapted to alternately deliver a charge of an explosive mixture and a scavenging charge to said chamber, whereby said charges will be alternately compressed and delivered to said cylinder through said intake port, and said piston will never have an explosive fluid upon both sides thereof at the same time.

8. An internal combustion engine of the four cycle type, embodying therein a cylinder having an intake and an exhaust port adjacent to one end thereof, a reciprocatory piston, a crank case communicating with said cylinder through said intake port and with said cylinder below said piston whereby gases therein contained will be compressed by said piston and delivered to said cylinder, means limiting the capacity of said crank case to substantially that of said cylinder, and a valve mechanism adapted to alternately deliver a charge of an explosive mixture and a scavenging charge to said chamber, whereby said charges will be alternately compressed and delivered to said cylinder through said intake port, and said piston will never have an explosive fluid upon both sides thereof at the same time.

9. An internal combustion engine of the four cycle type, embodying therein a cylinder having an intake and an exhaust port adjacent to one end thereof, a piston, adapted toward the end of the stroke, to open said exhaust port and said intake port successively, means forming a chamber in communication with said intake port and subject to pressure from a piston, and a valve mechanism for introducing the explosive mixture to said chamber during one stroke of the cycle, said valve mechanism being so set as to exclude the explosive mixture from said chamber during the compression and explosion strokes of the piston.

10. An internal combustion engine, of the four cycle type, embodying therein a cylinder having an intake and an exhaust port adjacent to one end thereof, a piston, means forming a chamber in communication with said intake port and subject to pressure from the piston, and a valve mechanism adapted to alternately deliver a charge of an explosive mixture and a scavenging charge to said chamber, whereby said charges will be alternately compressed and delivered to said cylinder through said intake port, and said piston will never have an explosive fluid upon both sides thereof at the same time.

11. An internal combustion engine of the four cycle type, embodying therein a plurality of cylinders, each having an intake and an exhaust port adjacent to one end thereof, a reciprocatory piston adapted toward the end of the stroke to open said exhaust port and said intake port successively, mounted in each cylinder, means forming a plurality of non communicating chambers in communication with said intake ports and subject to pressure from said pistons respectively, and a valve mechanism for introducing an explosive mixture to each said chamber during one stroke of the cycle as to its cylinder, said valve mechanism being so set as to exclude the explosive mixture from its chamber during the compression and explosion strokes of the piston.

12. An internal combustion engine of the four cycle type, embodying therein a plurality of cylinders, each having an intake and an exhaust port adjacent to one end thereof, a reciprocatory piston adapted toward the end of the stroke to open said exhaust port and said intake port successively, mounted in each said cylinder, means forming a plurality of non communicating chambers in communication with said intake ports and subject to pressure from said pistons respectively, and a valve mechanism common to all of said cylinders, for introducing an explosive mixture to each said chamber during one stroke of the cycle as to its cylinder, said valve mechanism being so set as to exclude the explosive mixture from its chamber during the compression and explosion strokes of the piston.

13. An internal combustion engine of the four cycle type, embodying therein a cylinder having an intake and an outlet port adjacent to one end thereof, a crank case in communication with said cylinder through said intake port, a reciprocatory piston, adapted, toward the end of the stroke, to open said exhaust port and said intake port successively, and a valve mechanism carried by said crank case, whereby it is removed from the area of high temperatures, for introducing an explosive mixture to said crank case during one stroke of the cycle, said valve mechanism being so set as to exclude the explosive mixture from said case during the compression and explosion strokes of the piston, whereby said explosive charge will be compressed in said crank case by the piston and firing across the piston is prevented.

14. An internal combustion engine of the four cycle type, embodying therein a cylinder having an intake and an exhaust port adjacent to one end thereof, a crank case in communication with said cylinder through said intake port, a reciprocatory piston, adapted, toward the end of the stroke, to open said exhaust port and said intake port successively, and a valve mechanism carried by said crank case, whereby it is removed from the area of high temperatures, for introducing an explosive mixture to said crank case during one stroke of the cycle, embodying therein a casing having a port opening into said crank case, and a rotary valve comprising concentric tubes having ports therein adapted to successively register with said port in said casing, said tubes respectively opening into atmosphere and communicating with a source of fuel supply, said valve mechanism being so set as to exclude the explosive mixture from and introduce air to said case during the compression and explosion strokes of the piston, whereby said explosive charge will be compressed in said crank case by the piston and firing across the piston is prevented.

15. An internal combustion engine of the four cycle type, embodying therein a plurality of cylinders, each having an intake and an exhaust port adjacent to one end thereof, a plurality of non communicating crank cases in communication severally with a cylinder through the intake port thereof, a reciprocatory piston in each cylinder, adapted toward the end of the stroke to open said exhaust port and said intake port successively, and a valve mechanism for introducing an explosive mixture to said crank cases, embodying therein a casing having ports opening into said crank cases respectively, and a rotary valve mounted in said casing comprising a plurality of concentric tubes having continuous ducts therein, and a plurality of ports adapted to successively register with said ports in said casing, one of said tubes opening into atmosphere, and the other said tube having ports therein whereby a fuel supply is introduced thereto, and means carried by said casing whereby said last named ports are always in communication with the carbureter lead pipe, said valve mechanism being so set as to exclude the explosive mixture from, and introduce air into and compress it in said cases during the compression and explosion strokes of the pistons, whereby said explosive charge will be compressed in said crank cases by the pistons, and firing across the pistons is prevented.

16. An internal combustion engine of the four cycle type, embodying therein a plurality of cylinders, each having an intake and an exhaust port adjacent to one end thereof, a plurality of non communicating crank cases in communication severally with a cylinder through the intake port thereof, a reciprocatory piston in each cylinder, adapted, toward the end of the stroke to open said exhaust port and said intake port successively, and a valve mechanism for introducing an explosive mixture to said crank cases, embodying therein a casing having ports opening into said crank cases respectively, and a rotary valve mounted in said casing, comprising a plurality of concentric tubes having continuous ducts therein, and a plurality of ports adapted to successively register with said ports in said casing, one of said tubes opening into atmosphere, and the other said tube having ports therein whereby a fuel supply is introduced thereto, means forming a continuous duct partially encircling said casing and opening inwardly thereof and adapted to communicate continuously with said ports in the gas tube, said valve mechanism being so set as to exclude the explosive mixture from, and introduce air into and compress it in said cases during the compression and explosion strokes of the pistons, whereby said explosive charge will be compressed in said crank cases by the pistons, and firing across the pistons is prevented.

17. An internal combustion engine of the four cycle type, embodying therein a cylinder having an intake and an exhaust port adjacent to one end thereof, a reciprocatory piston, closed at the bottom and adapted toward the end of the stroke to open said exhaust port and said intake port successively, means forming a chamber in communication with said cylinder, through said intake port, and a valve mechanism for introducing the explosive mixture to said chamber during the first stroke of the cycle, said valve mechanism being so set as to exclude the explosive mixture from said chamber during the compression and explosion strokes of the piston.

18. An internal combustion engine of the four cycle type, embodying therein a cylinder having an intake and an exhaust port adjacent to one end thereof, a crank case in communication with said cylinder, at the bottom thereof and through said intake port, a crank shaft mounted in said case, a reciprocatory piston adapted toward the end of the stroke to open said exhaust port and said intake port successively, a piston rod, disks mounted upon and rotatable with said crank shaft and reducing the capacity of said case, and a valve mechanism for introducing the explosive mixture to said crank case during the first stroke of the cycle, said valve mechanism being so set as to exclude the explosive mixture from said case during the compression and explosion strokes of the piston.

In witness whereof, I have hereunto affixed my signature, in the presence of two subscribing witnesses, this 1st day of December, 1911.

WALTER K. THOMAS.

Witnesses:
  T. T. WENTWORTH,
  EUGENE WENING.